Dec. 28, 1948.    F. S. FLOETER    2,457,359
PORTABLE PIN GRINDING MACHINE
Filed Aug. 11, 1945    2 Sheets-Sheet 1
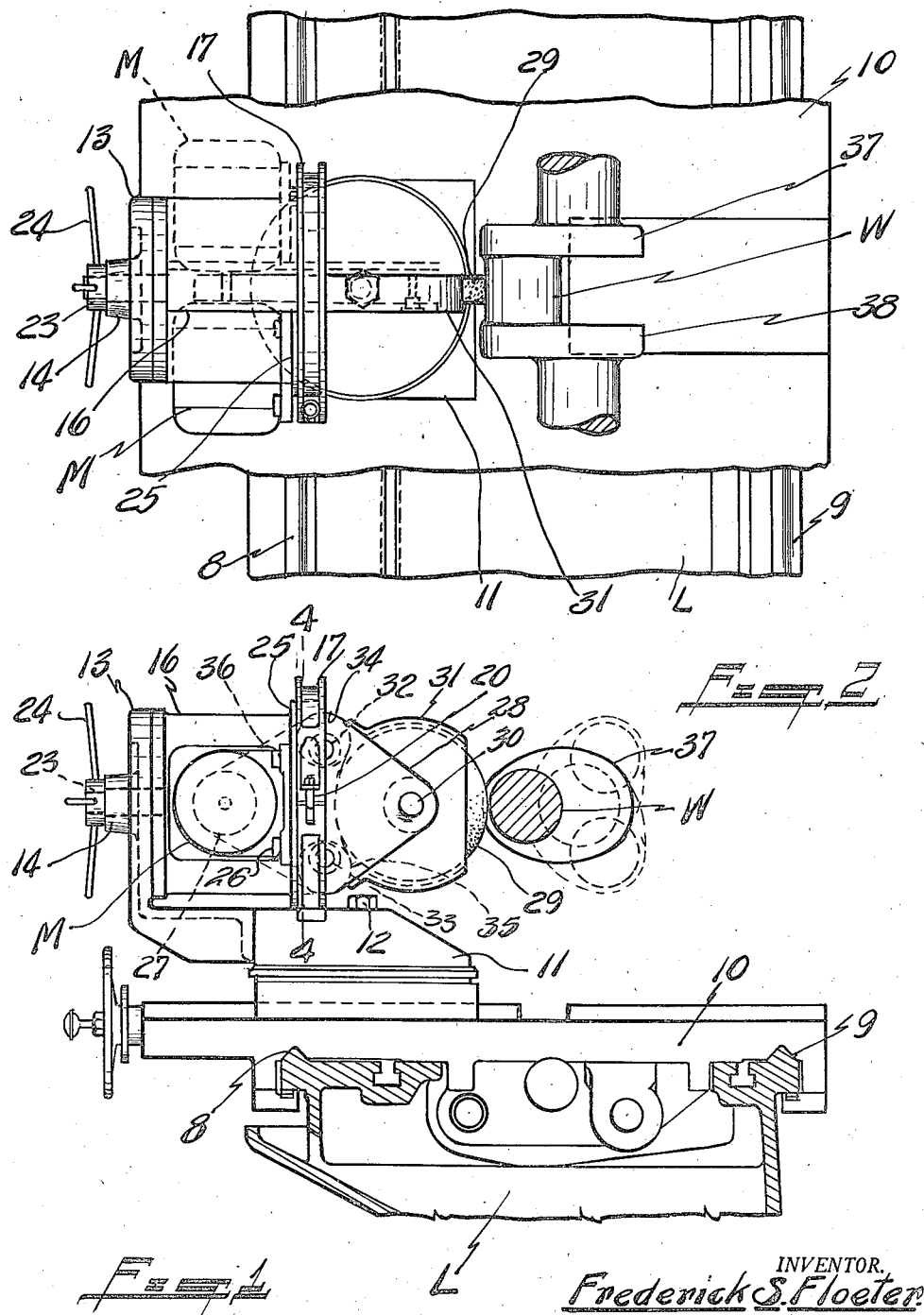
INVENTOR.
Frederick S. Floeter
BY Frank C. Fearman
Attorney.

Dec. 28, 1948. F. S. FLOETER 2,457,359
PORTABLE PIN GRINDING MACHINE
Filed Aug. 11, 1945 2 Sheets-Sheet 2.
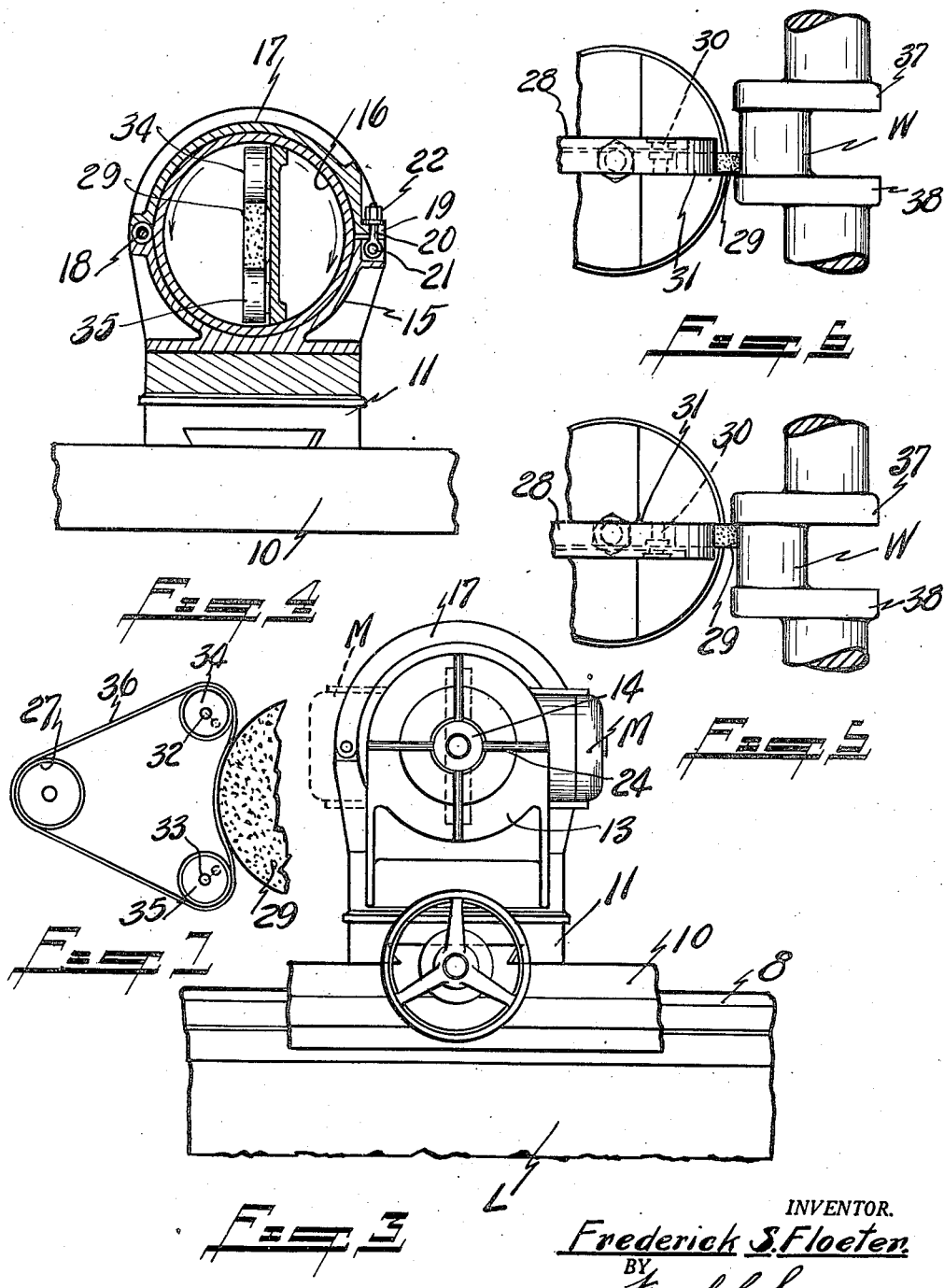
INVENTOR.
Frederick S. Floeter
BY Frank C. Scarman
Attorney.

Patented Dec. 28, 1948

2,457,359

UNITED STATES PATENT OFFICE 2,457,359

PORTABLE PIN GRINDING MACHINE

Frederick S. Floeter, Saginaw, Mich., assignor to Wickes Bros., Saginaw, Mich.

Application August 11, 1945, Serial No. 610,227

7 Claims. (Cl. 51—259)

This invention relates to grinding attachments for lathes and the like, and more particularly to a portable crankpin grinding attachment for grinding the full circumferential area of the crankpins and bearings of automotive, Diesel, or other types of crankshafts and similar equipment.

One of the prime objects of the invention is to design a self-contained portable motor-driven grinding wheel assembly unit which can be readily mounted and operated, and by means of which the entire cylindrical surface of a work piece may be accurately ground.

Another object is to design a simple, practical, and unique driving arrangement for the grinding wheel which provides ample clearance and in no manner interferes with the crankshaft cheeks or bearings as they are rotated and which effectively drives said grinding wheel.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a fragmentary, part-sectional view of a lathe with my portable pin-grinder in place thereon, the crankshaft pin being shown in section.

Fig. 2 is a top plan view of the mechanism shown in Fig. 1, the solid lines showing the grinding mechanism in position for grinding the crankpin, the broken lines showing the revolvable frame and grinding wheel swung through an arc of 180 degrees for grinding the pin area directly adjacent one of the cheeks of the crankshaft.

Fig. 3 is a fragmentary front-elevational view of the pin grinder and lathe, the broken lines showing the driving motor, etc., swung to another position of adjustment.

Fig. 4 is a transverse-sectional end view taken on the line 4—4 of Fig. 1.

Fig. 5 is a fragmentary plan view illustrating the grinding of one end section of the pin.

Fig. 6 is a similar view showing the wheel in position for grinding the opposite end section of the pin.

Fig. 7 is a schematic side-elevational view showing the grinding wheel drive.

Standard crankshafts are usually formed with transversely disposed projecting cheeks or webs on the ends of the line bearings, and the machining of these cheeks and bearings is performed with the crankshaft mounted in a lathe and rotated coaxially with the center-line thereof.

The grinding operation follows the machining and is done without removal of the crankshaft from the lathe, thus completing the work at one setting.

The throw of the crankshaft together with the cheek projections make it necessary that the grinding wheel assembly, and more especially that portion immediately adjacent the work, be of limited width, with the grinding wheel of sufficient diameter to permit it to engage the surface of the work as it is driven, so that the pin areas, directly adjacent the cheeks, may be accurately ground; and likewise, the means for driving the grinding wheel must be arranged to avoid interference with the rotating crankshaft so that the entire circumferential area of the pins may be ground.

My new design provides for clearances above referred to and permits the entire pin bearing, including the portions immediately adjacent the cheeks, to be accurately ground to size.

In the drawing, there is shown the conventional base structure of a lathe bed L having ways 8 and 9 for the usual tool slide 10 on which is mounted a sub-base 11 which is secured in position by means of the bolt 12, this subbase being formed with an upwardly projecting circular frame 13 at one end thereof, and a centrally disposed hub 14 is cast integral with said frame.

A circular steady rest 15 is spaced from the frame 13 and one end of a motor frame 16 is revolvably mounted therein, the steady rest being formed in two sections, the upper section being in the form of a yoke 17 which is hingedly connected to the base 15 by means of the pin 18, the opposite end of the yoke being bifurcated as at 19 to receive the eye-bolt 20 which is pivotally connected to the pin 21, the yoke being further recessed to accommodate the nut 22 for releasably locking said yoke in position, and to permit the upper yoke section of the rest to be swung to facilitate the assembly and/or removal of the motor frame.

The revolvable frame 16 is rotatably mounted in the frame and steady rest 13 and 15 respectively, and is formed with a longitudinally extending pin or trunnion 23 which is journaled in the hub 14, and a hand wheel 24 is secured on the outer end of the pin to facilitate rotation of the housing.

A flange 25 is provided on the revolvable frame 16, and a driving motor M is secured to said flange by means of studs 26, a drive pulley 27 being provided on the motor as usual.

A grinding wheel frame 28 is securely mounted on the frame 16, and projects rearwardly as shown, and a grinding wheel 29 is revolvably mounted thereon by means of a stud 30, a housing 31 forming a cover for the rim and one side only of said wheel and can be secured to the supporting frame 28 in any desired manner, the one edge of the cover being substantially flush with the edge of the grinding wheel, so that the corners formed by the pin and cheeks can be accurately ground, the exposed rim section of said wheel being disposed in proper relation to grind the work W as it is rotated.

Eccentric pins or trunnions 32 and 33 respectively are mounted on the frame 28, and idler pulleys 34 and 35 are mounted thereon, these trunnions being adjustable and for a purpose to be presently described.

The grinding wheel is driven from the motor M, a drive belt 36 being trained over the drive pulley 27, thence over pulley 34, thence engaging the rim of the grinding wheel 29 and thence over the pulley 35, this arrangement in no manner interfering with the cheeks of the crankshaft or the throw thereof as the crankshaft is rotated, the grinding wheel and drive being disposed in a path of considerably less width than the length of the pin W so that the grinding wheel can maintain grinding contact with the work without interference.

The revolvable frame 16 and grinding wheel 29 are freely rotatable in the frame and steady rest 13 and 15 by means of the hand wheel 24, and as indicated by the arrows in Fig. 4 of the drawings, and when in position as shown in Fig. 2, the grinding wheel assembly can be readily adjusted to grind the entire center section of the pin bearing and the pin surface directly adjacent the cheek 37 of the crankshaft.

To grind the opposite pin surface adjacent the companion cheek 38, the operator withdraws the grinding unit sufficiently to permit the rotatable frame 16 and grinding unit to be swung through an arc of 180 degrees so that the grinding wheel is positioned as shown in Fig. 6 of the drawings, thus permitting this end section of the pin to be accurately ground, the revolving of the motor frame in no manner affecting the drive, as it is a self-contained unit, and the eccentrically mounted pulleys 34 and 35 can be readily adjusted to tighten the belt and compensate for grinding wheel wear, etc.

The unit can be readily mounted, is easily manipulated and permits accurate grinding of the entire cylindrical surface of the pin.

What I claim is:

1. A portable pin-grinding machine adapted to be mounted on a lathe, and comprising a sub-base, a motor frame mounted for revolvable movement on the sub-base and including a wheel support, a motor mounted on said frame, a grinding wheel journaled on said support and rotatable therewith, means for rotating said frame, and flexible belt means for drivingly connecting said motor in frictional engagement with the outer peripheral surface of the grinding wheel.

2. A portable grinding machine adapted to be mounted on a lathe and comprising a sub-base, a motor frame revolvably mounted thereon, a grinding wheel supported on said frame, spaced-apart eccentrically mounted idler pulleys associated therewith, flexible driving means trained over said pulleys and having frictional driving engagement with the rim of the grinding wheel, and a motor mounted in said frame for actuating said driving means.

3. A construction as set forth in claim 2 in which the motor, grinding wheel, and driving means is freely revolvable as a unit.

4. A portable pin-grinding machine adapted to be mounted on a lathe and comprising a sub-base, a motor housing revolvably mounted thereon, a motor on said housing, a grinding wheel journaled on said housing and revolvable therewith, a guard forming a cover for said grinding wheel, and flexible driving means connected to said motor and engageable with the rim of the grinding wheel for driving said wheel, said guard covering the major portion of the rim and one side only of the grinding wheel.

5. A portable pin-grinding machine adapted to be mounted on a lathe, and comprising a sub-base, including a hinged, two-piece steadyrest, a motor frame assembly revolvably mounted in said steadyrest and including an offset wheel support, a grinding wheel journaled on said support and revolvable with said frame assembly, and flexible means drivingly connected to said motor for driving said wheel by frictional engagement with the rim thereof.

6. A construction as defined in claim 5 in which a pin is provided on the motor frame and journaled in said sub-base, and a hand wheel mounted on the pin for manual rotation of said frame.

7. A portable pin-grinding machine adapted to be mounted on a lathe and comprising a sub-base having a steadyrest, a revolvable frame mounted thereon and including a support, a grinding wheel journaled on said support and revolvable with said frame, a motor on said frame, vertically spaced idler pulleys journaled on said support and disposed in predetermined relation to said wheel, a hand wheel connected to the frame for manual rotation thereof, and a continuous drive belt geared to said motor and trained over said idler pulleys, said belt being disposed in driving relation with the rim of the grinding wheel.

FREDERICK S. FLOETER.

REFERENCES CITED

The following references are of record in the file of this patent:

UNITED STATES PATENTS

| Number | Name | Date |
| --- | --- | --- |
| 295,705 | Williams | Mar. 25, 1884 |
| 696,034 | Gabriel | Mar. 25, 1902 |
| 1,315,673 | Knott et al. | Sept. 9, 1919 |
| 1,766,839 | Roberts | June 24, 1930 |
| 2,071,882 | Kremer | Feb. 23, 1937 |
| 2,092,714 | Flygare | Sept. 7, 1937 |
| 2,319,582 | Carroll | May 18, 1943 |
| 2,349,108 | Myers | May 16, 1944 |